United States Patent [19]

Higgins et al.

[11] 4,238,008
[45] Dec. 9, 1980

[54] CONTROL VALVE LINKAGE

[75] Inventors: Robert D. Higgins, Highland Heights; John E. Wible, Painesville, both of Ohio

[73] Assignee: Towmotor Corporation, Mentor, Ohio

[21] Appl. No.: 949,323

[22] Filed: Oct. 6, 1978

[51] Int. Cl.³ .................. B60K 26/00; G05G 7/16
[52] U.S. Cl. ........................... 180/328; 74/491; 180/68.5; 326
[58] Field of Search ........... 180/77 TC, 77 R, 77 HT, 180/89.13, 89.14, 89.17, 89.18, 68.5; 74/491

[56] References Cited

U.S. PATENT DOCUMENTS

| | | | |
|---|---|---|---|
| 2,605,008 | 7/1952 | Schroeder | 180/68.5 |
| 3,256,949 | 6/1966 | Petersen | 192/51 |
| 3,610,359 | 10/1971 | Becker | 180/68.5 |
| 3,737,003 | 6/1973 | Beals et al. | 180/78 |
| 4,076,302 | 2/1978 | Sable | 180/89.14 |
| 4,135,592 | 1/1979 | Wincent | 180/77 HT |
| 4,140,200 | 2/1979 | Tucek | 180/77 HT |

Primary Examiner—John J. Love
Assistant Examiner—Donn McGiehan
Attorney, Agent, or Firm—Phillips, Moore, Weissenberger, Lempio & Majestic

[57] ABSTRACT

A control valve linkage arrangement which is closely adjacent a vehicle operator and which allows easy access to a compartment upon which the operator sits. A control linkage (12) is disclosed wherein positioning of the member (30) to be controlled determines a control signal. The linkage (12) is connected to the valve control member (30) and may be pivoted relative to the valve control member (30) along a plane generally containing the valve control member (30) without axial movement of the said member (30). The linkage (12) can also be moved axially thereby moving the control member (30) axially without pivoting the linkage (12) relative to the control member (30).

8 Claims, 3 Drawing Figures

U.S. Patent
Dec. 9, 1980
4,238,008
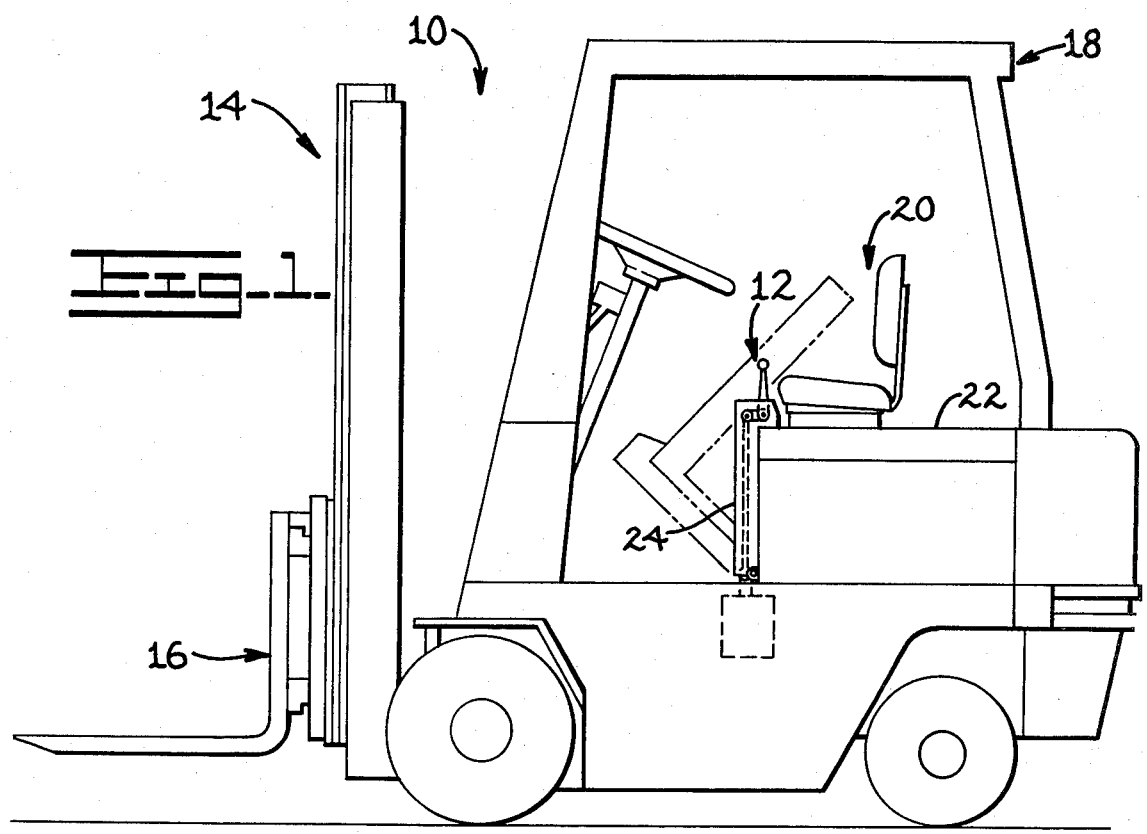
Fig. 1
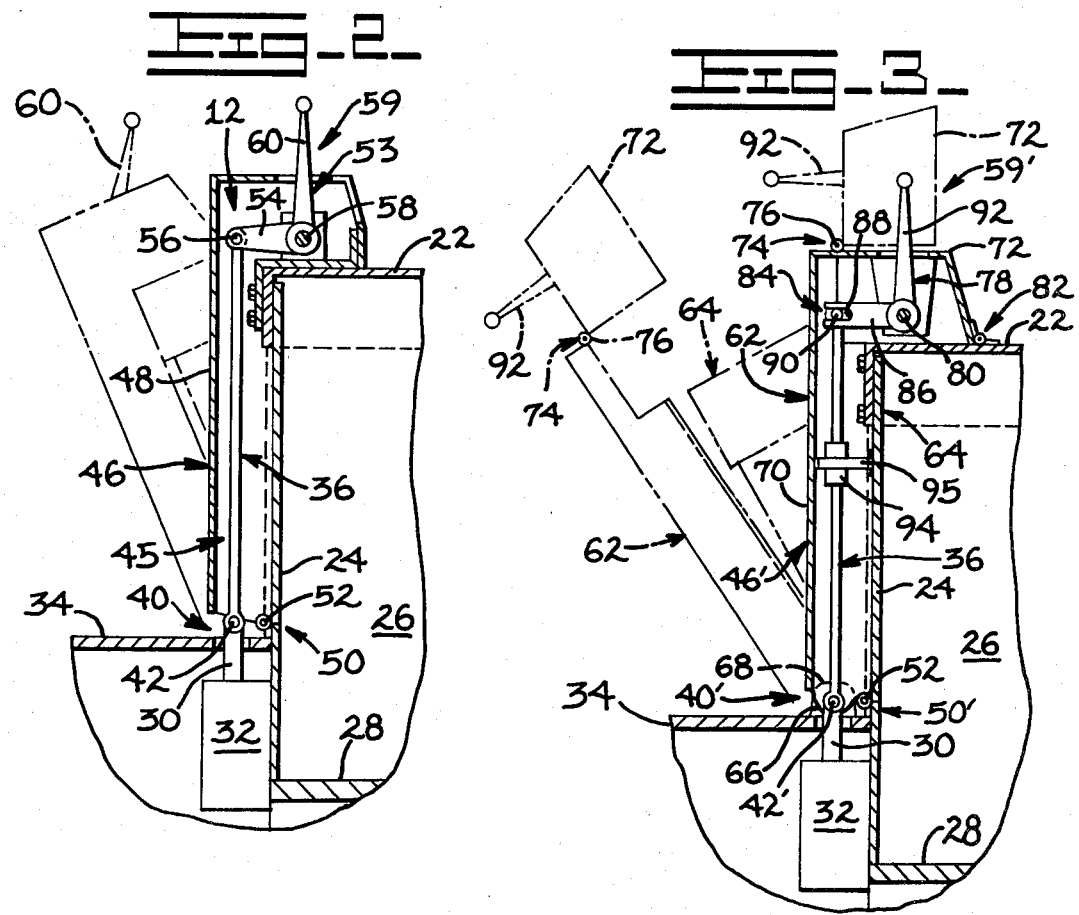
Fig. 2
Fig. 3

CONTROL VALVE LINKAGE

TECHNICAL FIELD

The invention relates to control linkages and, in preferred embodiments to linkages for the stems of control valves. More particularly the invention is concerned with control valve linkages as are utilized in lift trucks and similar vehicles wherein it is desirable to have the control linkage operable from a location adjacent the driver's seat of the vehicle, yet, it is necessary that the linkage be moveable away from the driver's seat without actuation of the control valve so that the area beneath the driver's seat (the hood) is available for installation, servicing and removal of equipment, such as a battery, engine or the like.

BACKGROUND ART

U.S. Pat. No. 3,737,003, issued June 5, 1973 to Duane E. Beals and Russell D. Page illustrates a prior art control linkage.

In vehicles such as lift trucks, a serious problem exists in getting full access to the tops of the compartments which hold the batteries or engines which power the trucks for installation, servicing and like purposes. The driver's seat generally sits upon the hood of such a compartment and controls should be as near thereto as possible for easy access and maximum driver control. Generally, a rather large and very heavy battery box fits in a battery compartment and a large engine within an engine compartment. Battery boxes must generally be lowered into the battery compartment, and engines into the engine compartment, from above. This, in turn, requires that the top or hood of the compartments be removable. Prior art battery compartments, for example, have generally had the tops or hoods thereof detachable by release of bolts, hooks, latches or the like. Thus, these battery compartments have normally been multi-piece to allow disassembly into separate parts or pieces. Such assembly and disassembly has, of course, been time consuming, thus increasing down-time of the vehicles.

As an alternative, the hood of the battery compartment can be made integral with a front panel and the front panel can be pivoted near the floor of the vehicle whereby the hood and front panel can be pivoted upwardly and forwardly away from the battery compartment thus allowing full access to the top thereof. In such an arrangement the operator seat is generally atop the hood. However, when such an arrangement is used it has normally been necessary to position the control levers and, more particularly, the linkages which control movement of the control valve stem, far forwardly on the truck, generally quite significantly removed from comfortable operator manipulation thereof to allow the aforementioned pivoting. This has led to operator fatigue and somewhat reduced control of the vehicle.

It is desirable to have the control linkage adjacent the operator so that the operator can have delicate control of the vehicle and, yet, to have a pivotal hood-front panel arrangement whereby it is not necessary to make use of bolts, hooks, latches and the like to assemble and disassemble separate pieces which, when assembled, constitute the battery or engine compartment of the vehicle. Prior to the present invention, such a versatile control valve linkage was not available in the relevant art. It would also be desirable if the arrangement of such a linkage would allow the control valve itself to be placed beneath the floor panel of a vehicle whereby it would be fully protected from any possible damage. A further advantage results when the valve is not shifted from its original setting upon rotation of the control linkage during raising of the hood whereby operator readjustment is not required.

DISCLOSURE OF INVENTION

In one aspect of the present invention an improvement is provided in a control linkage having a control member, the positioning of which determines a control signal. A link member is pivotally connected to the control member. Means are provided for pivoting the link member relative to the control member without axially moving the control member. Means are also provided for moving the link member substantially only axially to move the control member axially without significantly pivoting the link member relative thereto.

As a result of the present invention, a control linkage can be located closely adjacent a vehicle operator while allowing pivoting of the front panel and the hood upon which the operator sits to provide easy access to battery box compartments or the like. The linkage further pivots such that it does not interfer with movement of the panel and hood.

BRIEF DESCRIPTION OF DRAWINGS

The invention will be better understood by reference to the figures of the drawing wherein like numbers denote like parts throughout and wherein:

FIG. 1 illustrates in side elevation a lift truck equipped with a control linkage in accordance with an embodiment of the present invention;

FIG. 2 illustrates in partial, enlarged view, in section, a first and preferred embodiment of the control linkage of the present invention;

FIG. 3 in a view similar to FIG. 2 illustrates an alternate embodiment of a control linkage in accordance with the present invention.

BEST MODE FOR CARRYING OUT THE INVENTION

Adverting to FIG. 1, there is illustrated a conventional lift truck 10 equipped with a control linkage 12 in accordance with the present invention. The lift truck 10 is of conventional nature having a mast assembly 14 on which a carriage 16 rides, and an overhead guard 18 located above a driver's seat 20. Referring both to FIG. 1 and FIG. 2, the driver's seat 20 is mounted upon a hood 22. The hood 22, along with a front panel 24, and other adjacent structure defines a battery box compartment 26 in which a battery (not illustrated) of a conventional construction sits. Generally, the compartment 26 will include a recessed well portion 28 whereby it is necessary to remove the battery box from the battery box compartment 26 generally straight upwardly to clear adjacent structure.

It should be understood that while the invention herein will be described in connection with a preferred use environment, the invention is not considered to be limited to useage in this particular environment. The present application will, for convenience, describe the linkage 12 solely in connection with its use in a lift truck environment, but it should be understood that this discussion is not meant to be in any way limiting.

Adverting primarily to FIG. 2, it will be seen that the control linkage 12 includes a control member (such as a stem) of a control valve 32, for example, a control valve suitable for controlling lift and tilt action of the mast assembly 14. Thus, reciprocal positioning of the control member 30 determines a control signal from the control valve 32 which leads to control of operation of, for example, the mast assembly 14 and carriage 16. It should further be noted that the control valve 32 is located beneath a floor 34 of the vehicle whereby the control valve 32 is protected from accidental damage. A link member 36 is provided which is connected by pivotal connecting means 40, in the embodiment illustrated a pivot pin 42, to the control member 30. The pivotal connecting means 40 serves as means for pivoting the link member 36 relative to the control member 30 along a plane generally containing the control member 30, while not axially moving the control member 30.

The pivotal connecting means 40 generally comprises a pivot pin 42 and a 4-bar substantially parallelogram linkage 45. The parallelogram linkage 45 includes the link member 36 and an enclosure structure 46. In the embodiment of FIG. 2, the enclosure structure 46 includes an enclosure 48 which is adjacent and generally parallel to the link member 36, along with pivoting means 50. The pivoting means 50, in the embodiment illustrated, is a pivot pin 52 which serves for pivoting the enclosure 48 along with the link 36 while maintaining a generally parallel relation therebetween.

As will be noted from FIG. 2 the pivotal connecting means 40 serves to pivotally connect the link member 36 (at the pivot pin 42) to extend generally axially from the control member 30. The parallelogram linkage 45 previously mentioned further comprises a bellcrank 53 pivotally attached at a first arm 54 thereof to the link member 36 at a pivot pin 56 and pivotally attached centrally thereof at a pivot pin 58 to the enclosure 48. The first arm 54 of the bellcrank 53 thus comprises a leg of the parallelogram linkage 45 which connects the link member 36 to the enclosure 48. The fourth leg of the linkage 45 may be thought of as an imaginary line connecting pivot pins 42 and 52. The bellcrank 53 serves as means 59 for motivating substantially only axial movement of the link member 36 to cause axial movement of the control member 30 without significantly pivoting the link member 36 relative to the control member 30. A second arm 60 of the bellcrank 53 serves as a lever for actuating the axial movement of the link member 36.

It will be noted that the pivot pins 42 and 52 are both very advantageously located adjacent the floor 34 of the vehicle and adjacent the control valve 32 to allow maximum forward rotation of the hood 22 and front panel 24 without interference with operation of the control valve 32 thus accomplishing a prime object of the invention.

INDUSTRIAL APPLICABILITY OF THE FIG. 2 EMBODIMENT

The FIG. 2 embodiment of the invention is particularly advantageously used with lift trucks.

With the linkage 12 in the position shown in solid lines in FIG. 2, movement of the second arm (or control lever) 60 of the bellcrank 53 leads to axial movement of the link member 36 which, in turn, leads to axial movement of the control member 30. With the control member 30 in any reciprocal position relative to the control valve 32, it may become desirable to tilt the hood 22 and front panel 24 forwardly to allow access to the battery box compartment 26. In such a situation, the hood 22 and with it the front panel 24 are simply tilted in a counterclockwise direction by pivoting about the pivot pin 52. The link member 36 at the same time simply pivots about the pivot pin 42 and the first arm 54 of the bellcrank 52 simply pivots about pivot pins 56 and 58.

Thus, the parallelogram linkage 45 simply folds somewhat and no significant axial force is produced by the link member 36 upon the control member 30. Minimal internal resistance within the control valve 32 keeps the control member 30 from being moved axially and causes the parallelogram linkage 45 to collapse. The compartment 26 is then fully exposed for inserting a new battery box or the like therein. The dashed lines in FIG. 2 illustrate the position of the second arm 60 of the bellcrank 52, namely that arm which serves as a lever for controlling the control valve 32, when the hood 22 and front panel 24 have been tilted in a counterclockwise direction. When access to the battery box compartment 26 is no longer necessary, the hood 22 and front panel 22, which are normally attached to each other as by bolts or the like, are simply pivoted in a clockwise direction until the hood and control linkage 12 again assume the positions shown in solid lines in FIG. 2. It should be noted that the control member 30 is not moved and, hence, the control valve 32 remains in the mode it was in prior to pivoting of the linkage 12.

ALTERNATE EMBODIMENT OF FIG. 3

Adverting now to FIG. 3, there is illustrated therein an alternate embodiment of the present invention which provides the advantages thereof in a structurally somewhat different matter than the embodiment of FIG. 2. In the embodiment illustrated in FIG. 3 the pivotal connecting means 40', in the embodiment illustrated the pivot pin 42', pivotally connects the link member 36 to extend axially from the control member 30. The enclosure structure 46' in the embodiment of FIG. 3 comprises a cover structure 62 generally parallel to and disposed about the link member 36. The enclosure structure 46' further comprises an enclosure 64, which includes the front panel 24, generally parallel to the link member 36 and to the cover structure 62.

In the embodiment of FIG. 3, the enclosure structure pivoting means 50' pivotally connects the cover structure 62 to pivot about a pivotal axis, generally aligned with the axis of the pivot pin 42', which pivotally connects the link member 36 to the control member 30. As will be seen, such pivotal connecting can be accomplished by providing a tab 66 supported by the floor 34 and an aligned tab 68 extending downwardly from the cover structure 62, with the tabs 66 and 68 being pivotally connected to one another. It should be noted that it is not necessary that the pivotal connecting be precisely in line with the axis of the pivot 42' but that only generally co-axial alignment is sufficient.

Turning now to a more detailed consideration of the cover structure 62, it will be noted that this includes a first member 70 and a second member 72 along with means 74 for pivotally connecting the first and second members to one another. In the embodiment of FIG. 3, the pivotal connecting means 74 simply comprises a hinge 76. The first member 70 is that portion of the cover structure 62 which is pivotally connected by the enclosure structure pivoting means 50' adjacent to pivot pin 42'. The importance of operating with a cover structure 62 in the form of a first member 70 and a second member 72 which are pivotally connected to one another will be apparent from the discussion which follows.

The means 59' for axially moving the link member 35 without pivoting said link member 36 relative to the control member 30 comprises a bellcrank 78 which is pivotally connected centrally thereof at a pin 80 to the second member 72 of the cover structure 62. Means 82 (for example, a latch which can be locked in the position shown) is provided for releasably fastening the second member 72 to the enclosure 64. Means 84 are provided for releasably securing a first arm 86 of the bellcrank 78 to the link member 36. The releasably securing means 84, in particular a slot 88 in the first arm 86 and a slidably engaging pin 90 on the link member 36, serves to release the pin 90 from the slot 88 responsive to pivoting of the second member 72 away from the enclosure 74 and into the position shown in phantom in FIG. 3. Thus, on unfastening of the fastening means 82, the second member 72 can be pivoted upwardly (counterclockwise) whereby the means 84 for releasably securing the first arm 86 of the bellcrank 78 to the link member 36, releases its engagement with the link member 36, thus pivoting the cover structure 62 without motivating the link member 36. The control member 30 is not thereby moved in an axial direction.

By reference to FIG. 3 it will be apparent that the preferred releasably securing means 84 comprises the aforementioned slot 88 and pin 90. It should be apparent that the slot 88 can be on either the link member 36 or the first arm 86 of the bellcrank 78 and the pin 90 on a respective other thereof. As in the embodiment of FIG. 2, a second arm 92 of the bellcrank 78 serves as a lever for activating the bellcrank 78 to motivate the link member 36 to move axially, thus moving the control member 30 axially without pivoting the link member 36 relative to the control member 30.

A sleeve 94, carried by a post 95 extending leftwardly from the front panel 24, serves to restrain the link member 36 from moving laterally relative to front panel 24. FIG. 3 also shows a phantom view of the entire cover structure 62 rotated counterclockwise along with the enclosure 64 whereby the battery box compartment 26 can be fully exposed from above to allow insertion and/or removal of a battery box.

It should be noted that in the embodiment of FIG. 3 it is possible to rotate only the cover structure 62 forwardly thus providing access to the link member 36, is desired, for servicing purposes or the like. It should also be noted that the control valve 32 does not change modes of operation when the linkage 12 is rotated since the control member 30 is not moved axially. Due to the disconnection of slot 88 and pin 90, the link member 36 will not move axially relative to the control member 30 but will slide axially relative to the front panel 24 on pivoting thereof about enclosure structure pivoting means 50'.

INDUSTRIAL APPLICABILITY OF THE FIG. 3 EMBODIMENT

The FIG. 3 embodiment of the invention is particularly advantageously used with lift trucks and with other heavy duty vehicles. Operation thereof should be apparent from the preceding description thereof.

Other aspects, objects and advantages of this invention can be obtained from a study of the drawings, the disclosure and the appended claims.

What is claimed is:

1. In a control valve linkage (12) having a control valve (32) mounted beneath a floor (34) of a vehicle (10), and a control member (30) having a top end portion extending upwardly from the control valve (32) through the floor (34), axial positioning of said control member (30) determining a control signal from said control valve (32) and controlling operation of a work circuit carried by the vehicle (10), the improvement comprising:
   a link member (36) having first and second member end portions;
   means (40) for attaching said first member end portion to said top end portion of said control member (30), said link member (36) being pivotable about an axis and only in a plane;
   an enclosure structure (46) having first and second structure end portions, said structure (46) being positioned a spaced distance from and substantially parallel to said link member (36);
   means (50) for attaching said structure first end portion to said vehicle (10) at a location above said floor (34) adjacent said member first end portion for pivoting in said plane;
   a bellcrank (53) having a first arm (54), a second arm (60) and a central portion, said first arm (54) and said central portion being in said plane;
   means (56) for attaching said first arm (54) to said member second end portion for pivoting in said plane; and
   means (58) for attaching said central portion to said structure second end portion, said bellcrank (53) being pivotable in said plane;
   said structure (46), said link member (36), said first arm (54) and said spaced distance between said means (40) and said means (50) defining a substantially parallelogram linkage (45) in said plane providing pivoting of said link member (36) about said means (40) without axial movement of said control member (30) and providing pivoting of said second arm (60) to provide axial movement of said link member (36) to axially move said control member 30 without significant pivoting of said link member (36) about said means (40).

2. The linkage (12) as set forth in claim 1, wherein said means (40) and said means (50) are substantially an equal distance above said floor (34).

3. The linkage (12) as set forth in claim 1, wherein said enclosure structure (46) includes a generally vertical front panel (24) of a battery box compartment (26) of the vehicle (10) and a generally horizontal hood (22) extending over said compartment (26).

4. In a control valve linkage (12) having a control valve (32) located beneath a floor (34) of a vehicle (10), a control member (30) having a top end portion extending upwardly from the control valve through the floor (34), axial positioning of said control member (30) determining a control signal from said control valve (32) and controlling operation of a work circuit carried by the vehicle (10), the improvement comprising:
   a link member (36) having first and second member end portions;
   means (40') for attaching said first member end portion to said top end portion of said control member (30), said linkage member (36) being pivotable about an axis and only in a plane;
   an enclosure structure (46') including a cover structure (62) including a first member (70) having first and second structure end portions, a second member (72) and means (74) for connecting the first (70) and second (72) members adjacent said second structure end portion for pivoting in said plane, said structure (62) being positioned substantially parallel to said link member (36), and an enclosure (64) generally parallel to said link member (36) and on an opposite side of said link member (36) from said cover structure (62);

means (50') for attaching said structure first end portion to said vehicle (10) at a location above said floor (34) adjacent said member first end portion pivoting in said plane about an axis generally in line with said axis of said means (40');

a bellcrank (78) having a first arm (86), a second arm (92) and a central portion, said first arm (86) and said central portion being in said plane;

means (84) for releasably securing said first arm (86) to said member second end portion for pivoting in said plane;

means (80) for attaching said central portion to said second member (72), said bellcrank (78) being pivotable in said plane; and means (82) for releasably fastening said second member (72) to said enclosure (64) adjacent said structure second end portion.

5. The linkage (12) as set out in claim 4, wherein said means (84) includes a slot (88) in said first arm (86) and a pin (90) on said link member (36), said pin (90) being positioned for sliding engagement in said slot (88) when said means (82) fastens said second member (72) to said enclosure (64).

6. The linkage (12) as set out in claim 4, further comprising:

means (52) for attaching said enclosure (64) to said vehicle (10) adjacent said floor (34) for pivoting in said plane.

7. The linkage (12) as set out in claim 4, further including:

means (94,95) for restraining said link member (36) from moving laterally relative to said enclosure (64).

8. The linkage (12) as set out in claim 4, wherein said enclosure structure (46') includes a generally vertical front panel (24) of a battery box compartment (26) of the vehicle (10) and a generally horizontal hood (22) extending over said compartment (26).

* * * * *